United States Patent [19]

Komarov et al.

[11] Patent Number: 4,927,121
[45] Date of Patent: May 22, 1990

[54] SPRING LEAF WITH A DIMINISHING THICKNESS TOWARDS THE ENDS THEREOF AND HAVING SHOULDERS ON OPPOSITE SIDES

[76] Inventors: Alexandr N. Komarov, ulitsa Pisarzhevskogo, 7, kv. 78.; Vitaly T. Shevtsov, Topol 3, II, korpus 3, kv. 99.; Viktor E. Zema, bulvar Slavy, 44, korpus I. kv. 42.; Grigory L. Lebedik, ulitsa Pisarzhevskogo, 7, kv. 6., all of Dnepropetrovsk; Evgeny M. Zema, ulitsa Chekhova, Ib, kv. 1., Sinelnikovo Dnepropetrovskaya oblast; Vladimir A. Nedorezov, ulitsa Chekhova, Ib, kv. 2., Sinelnikovo, Dnepropetrovskaya oblast; Anatoly K. Oblovatsky, prospekt Mira, 33, kv. I0., Sinelnikiovo, Dnepropetrovskaya oblast; Boris Y. Drozdov, ulitsa Tsentralnaya, 2/4, kv. I8., Dnepropetrovsk; Andrei A. Zezjulinsky, ulitsa Geroev Stalingrada, 3I, kv. 62., Dnepropetrovsk; Sergei V. Kovalenko, prospekt Petrovskogo, 42a, kv. 38., Dnepropetrovsk; Alexandr N. Litvin, ulitsa Mira, 37, kv. 26., Sinelnikovo, Dnepropetrovskaya oblast; Vladislav P. Yatsenko, ulitsa Dnepropetrovskaya, 20., Sinelnikovo, Dnepropetrovskaya oblast; Alexandr N. Katunin, ulitsa Mira, 36, kv. 75., Sinelnikovo, Dnepropetrovskaya oblast, all of U.S.S.R.

[21] Appl. No.: 810,390

[22] Filed: Dec. 18, 1985

[51] Int. Cl.⁵ .............................................. F16F 1/18

[52] U.S. Cl. .................................... 267/47; D12/159; 267/36.1; 267/158

[58] Field of Search .................................... 267/47-50, 267/36, 37, 44, 158-165; 280/718-720; 248/629, 626; 428/603; D12/159-162, 155

[56] References Cited

U.S. PATENT DOCUMENTS

| 129,297 | 7/1872 | Saladee | 267/47 |
|---|---|---|---|
| 1,254,493 | 1/1918 | Frood | 267/47 |
| 1,792,343 | 2/1931 | Wikander | 267/47 |
| 1,907,912 | 5/1933 | Wallace | 267/47 |
| 2,450,869 | 10/1948 | Berry | 267/47 |
| 2,533,511 | 12/1950 | Rowland et al. | 267/47 |
| 2,891,787 | 6/1959 | Reinhardt | 267/49 |
| 3,452,974 | 7/1969 | Dixon | 267/47 |
| 3,585,086 | 6/1971 | Hrusovsky | 267/47 X |
| 3,975,005 | 8/1976 | Duchemin | 267/47 |
| 4,546,958 | 10/1985 | Ohno et al. | 267/47 |

FOREIGN PATENT DOCUMENTS

| 0465310 | 9/1928 | Fed. Rep. of Germany | 267/47 |
|---|---|---|---|
| 0653851 | 5/1928 | France | 267/47 |
| 0647048 | 2/1979 | U.S.S.R. | |
| 0819443 | 4/1981 | U.S.S.R. | 267/158 |

Primary Examiner—Douglas C. Butler
Attorney, Agent, or Firm—Burgess, Ryan and Wayne

[57] ABSTRACT

A spring leaf including a central section having a substantially constant thickness; a first terminal section integrally connected at a first end of the central section; the first terminal section having a thickness diminishing from the first end of the central section; a second terminal section integrally connected at a second and opposite end of the central section; the second terminal section having a thickness diminishing from the second end of the central section; a plurality of upstanding shoulders on opposite sides of the spring leaf and extending at least along a portion of the opposite sides in the longitudinal direction thereof.

8 Claims, 2 Drawing Sheets

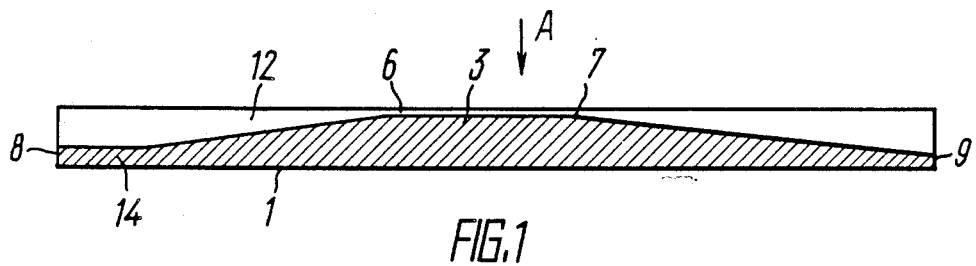
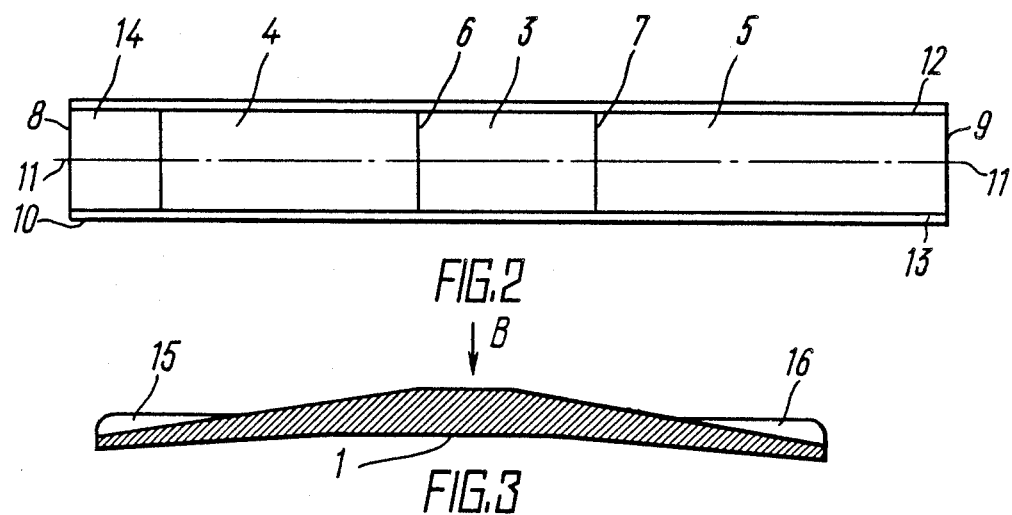

SPRING LEAF WITH A DIMINISHING THICKNESS TOWARDS THE ENDS THEREOF AND HAVING SHOULDERS ON OPPOSITE SIDES

TECHNICAL FIELD

The present invention relates to mechanical engineering, and more particularly, to spring leaves.

The invention may be used in spring suspensions of wheeled transportation facilities.

BACKGROUND OF THE INVENTION

The increasing numbers of transportation facilities today and their higher load-carrying capacity necessitate a higher strength and reliability of springs and a lower metal consumption. The widely used prior art multi-leaf springs are made in the form of a stack of leaves having different lengths and a constant section throughout the length of each leaf. Such springs feature a high metal consumption, and are not sufficiently reliable due to interleaf friction in operation.

Known in the art is a spring leaf (cf. USSR Inventor's Certificate No. 647,048, cl. B 21 H 8/00 1/20, published in 1979) with constant-width main and additional bases, of which the additional base includes a middle part with a constant leaf thickness and two adjacent terminal parts with the leaf thickness diminishing from their junction with the middle part towards the leaf end faces. The leaf end faces in the given case have a greater thickness due to the fact that the requisite strength of the leaf is attained by increasing the thickness of its terminal parts located near the end faces thereof, which results in a higher consumption of metal required for the spring leaves and the spring as a whole.

Moreover, when stacking such leaves together they must be fixed relative to each other, which calls for special fasteners, specifically, leaf retainers, thereby resulting in fretting and breakage of leaves primarily at their junctions with the leaf retainers and in higher consumption of metal in the spring due to the necessity of using the retainers.

SUMMARY OF THE INVENTION

An object of the present invention is to provide a spring leaf with higher strength characteristics.

Another object of the present invention is to enhance the reliability of fastening of the spring leaf in the spring.

This is accomplished in a spring leaf including central section having a substantially constant thickness; a first terminal section integrally connected to a first end of the central section; the first terminal section having a thickness diminishing from the first end of the central section; a second terminal section integrally connected at a second, opposite end of the central section; the second terminal section having a thickness diminishing from the second end of the central section; a plurality of upstanding shoulders on opposite sides of the spring leaf and extending at least along a portion of the opposite sides in the longitudinal direction thereof.

It is expedient that the height of each shoulder in the claimed spring leaf diminishes towards the middle part.

It is desirable that each shoulder in the claimed spring leaf has a maximum height equal to 0.6–0.9 of the height of the middle part.

It is reasonable that with two shoulders provided in the claimed spring leaf, each shoulder has a length equal to the length of the leaf.

It is possible that with four shoulders provided in the claimed spring leaf, each shoulder has a length equal to 0.1–0.2 of the length of the terminal part.

It is advantageous that each shoulder in the claimed spring leaf has a minimum height equal to 0.02–0.3 of the height of the middle part.

It is also possible that the shoulders in the claimed spring leaf are located pairwise on the terminal parts near the leaf end faces.

It is preferable that one of the terminal parts of the additional base in the claimed leaf spring with a constant maximum height of the shoulders at the end thereof has a constant leaf thickness zone.

It is practicable that the leaf constant thickness zone in the claimed spring leaf has a length equal to 0.1–0.25 of the length of the terminal part.

The present invention allows the strength of the spring to be increased, the leaf cross-sectional area and, consequently, metal consumption to be reduced, with permissible stresses in an operable spring remaining unchanged.

Furthermore, the present invention makes it possible to ensure reliable fastening of leaves in a spring stack and to prevent lateral displacement of leaves relative to each other.

BRIEF DESCRIPTION OF THE DRAWINGS

Other objects and advantages of the present invention will hereinafter become more fully apparent from specific embodiments thereof taken in conjunction with the accompanying drawings, wherein:

FIG. 1 is a schematic representation of a spring leaf with two shoulders (longitudinal section), according to the invention;

FIG. 2 is a view along arrow A in FIG. 1;

FIG. 3 schematically shows a spring leaf with four shoulders (cross section), according to the invention;

DETAILED DESCRIPTION OF THE INVENTION

Figure 4:
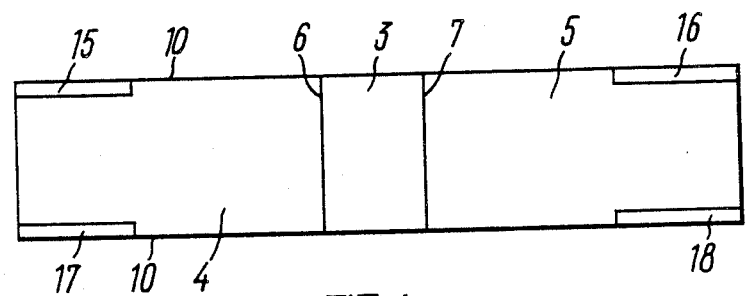
FIG. 4 is a view along arrow B in FIG. 3.

A spring leaf 1 has a constant-width base (FIGS. 1, 2) and includes a middle or central part 3 with a constant leaf thickness, and two adjacent terminal parts 4, 5 along which the thickness diminishes from lines 6, 7 of the junction with the middle part 3 towards leaf end faces 8, 9. Opposite sides 10 of the leaf 1 are provided with shoulders 12, 13 parallel to a longitudinal axis 11 thereof. The height of each shoulder 12, 13 diminishes towards the middle part 3. A maximum height of each shoulder 12, 13 is equal to 0.6–0.9 of the height of the middle part 3, and their minimum height throughout the whole length of the middle part 3 is equal to 0.02–0.3 of the height thereof.

The terminal part 4 with a constant maximum height of the shoulders 12, 13 at the end thereof has a leaf constant thickness zone 14. The length of the zone 14 is equal to 0.1–0.25 of the length of the terminal part 4.

In accordance with another embodiment of the invention, a spring leaf 1 contains four shoulders 15, 16, 17, 18 (FIGS. 3, 4). The shoulders 15, 17, 16, 18 are located pairwise on the terminal parts 4, 5 near the leaf end faces 8, 9. Each shoulder 15, 16, 17, 18 has a length equal to 0.1–0.2 of the length of the terminal part 4 or 5. In other respects, the spring leaf is similar to that described hereinabove. It is noted that the lower surface of leaf spring 1 is angled downwardly at terminal parts 4, 5 with respect to middle part 3.

Figure 5:
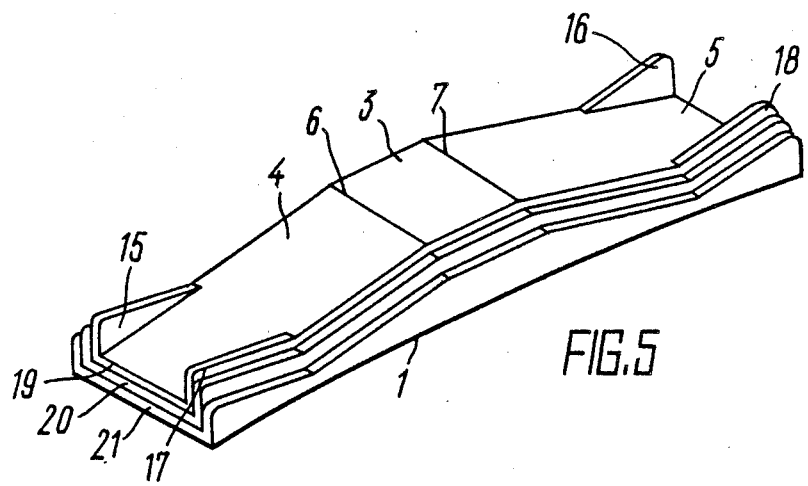
FIG. 5 is a schematic representation of a spring stack made up of spring leaves as shown in FIG. 4 without fasteners in the middle part (axonometric projection), according to the invention.

FIG. 5 shows a spring stack made up of three spring leaves 19, 20, 21.

The width of the leaf 19 is less than that of the leaf 20, whereas the width of the leaf 20 is smaller than that of the leaf 21 by a total width of the shoulders 15, 16, (17, 18). The leaves 19, 20, 21 are placed one inside the other. Fasteners on the middle part 3 are not shown in the drawing.

The above spring leaves may be manufactured by lengthwise rolling of strips with subsequent machining and thermal treatment thereof.

The spring leaves described hereinabove and shown in FIGS. 1, 2, 3, 4, 5 are stacked together and rigidly secured on the axle of a wheeled transportation facility (e.g. a motor vehicle), with the ends thereof freely coupled with the body. In an operable spring, vertical loads acting on the leaves 19, 20, 21 (FIG. 5) cause the terminal parts 4, 5 to deflect, with the ends thereof shifting in a longitudinal and a transverse direction one relative to the other, thereby ensuring the elasticity of the entire spring. According to the invention, the shoulders 15, 16, 17, 18 prevent transversal displacement of the leaves 19, 20, 21 in the spring stack.

The present invention makes it possible to reduce the mass of a spring leaf and, consequently, of the spring as a whole.

What is claimed is:

1. A spring leaf comprising:
    a central section having a substantially constant thickness;
    a first terminal section connected at a first end of said central section and having a first free end;
    said first terminal section having a thickness diminishing from said first end of said central section toward the first free end;
    a second terminal section connected at a second, opposite end of said central section and having a second free end;
    said second terminal section having a thickness diminishing from said second end of said central section toward the second free end; and
    a plurality of upstanding shoulders on opposite sides of said spring leaf and extending at least along a portion of said opposite sides in the longitudinal direction thereof substantially to the ends of the first and second terminal sections, the height of each said shoulder diminishing from the first and second free ends towards the central section of the spring leaf.

2. A leaf as claimed in claim 1, wherein each said shoulder has a maximum height equal to 0.6–0.9 of the height of said central section.

3. A leaf as claimed in claim 2, wherein there are two shoulders provided thereon and each said shoulder has a length equal to the length of said leaf.

4. A leaf as claimed in claim 3, wherein each said shoulder has a minimum height equal to 0.02–0.3 of the height of said central section.

5. A leaf as claimed in claim 4, wherein said first terminal section has a zone of constant thickness at an extreme end of said leaf.

6. A leaf as claimed in claim 5, wherein said zone of constant thickness of said leaf has a length equal to 0.1–0.25 of the length of said first terminal section.

7. A leaf as claimed in claim 2, wherein there are four shoulders provided thereon and each said shoulder has a length equal to 0.1–0.2 of the length of said terminal sections, and said shoulders are located pairwise on said terminal sections near said first and second free ends of said leaf.

8. A leaf as claimed in claim 7, wherein said first terminal section has a zone of constant thickness at an extreme end of said leaf.

* * * * *